United States Patent [19]
Becker et al.

[11] 3,837,795
[45] Sept. 24, 1974

[54] METHOD AND APPARATUS FOR STAINING SLIDES

[75] Inventors: Stanley A. Becker, Stroudsburg; William B. Fizette, Henryville, both of Pa.; Richard T. Wood, Staten Island, N.Y.

[73] Assignee: Biomatics Instrument Corporation, Stroudsburg, Pa.

[22] Filed: Nov. 5, 1971

[21] Appl. No.: 195,911

[52] U.S. Cl.............................. 8/3, 8/94.11, 117/3, 424/3
[51] Int. Cl............................................. D06p 3/00
[58] Field of Search........... 8/3, 94.11; 117/3; 424/3

[56] References Cited
UNITED STATES PATENTS

| | | | |
|---|---|---|---|
| 2,393,580 | 1/1946 | Weiskopf | 117/3 |
| 2,581,523 | 1/1952 | Ferrari | 8/3 UX |
| 3,114,609 | 12/1963 | Jones | 23/253 R X |
| 3,667,896 | 6/1972 | McCormick et al. | 8/94.11 X |

*Primary Examiner*—Thomas J. Herbert, Jr.
*Attorney, Agent, or Firm*—Kirschstein, Kirschstein, Ottinger & Frank

[57] ABSTRACT

A method for staining biological material on flat slides is disclosed. A group of slides is successively dipped in vessels containing different liquids conventionally used in staining. All the slides in the group are held in vertical parallel relationship while the slides are in the successive vessels. The time a group of slides is in any given vessel is controlled in accordance with the staining technique desired. One of the vessels has a de-colorizing agent in it. In at least this vessel a laminar flow of de-colorizing liquid is directed over the flat faces of the slides to create a chimney effect that minimizes cross-contamination. The de-colorizing liquid is withdrawn continuously from its vessel, filtered and re-introduced into the vessel.

8 Claims, 13 Drawing Figures

INVENTORS
STANLEY A. BECKER
BY WILLIAM B. FIZETTE
RICHARD T. WOOD

ATTORNEYS

FIG. 11

METHOD AND APPARATUS FOR STAINING SLIDES

BACKGROUND OF THE INVENTION

1. Field of the Invention

This invention relates generally to the microbiological arts and more particularly to an improved method and apparatus for staining bacteriological slides.

2. Description of the Prior Art

Although the method and apparatus comprising the present invention has a wide range of applications, the following disclosure will be directed, for purposes of ease of explanation, particularly to the Gram procedure for progressive staining of microbiological slides.

In 1884 a method was developed by Gram for differentially staining bacteria. The Gram method permits bacteria to be divided into gram-positive forms and gram-negative forms. All of the bacteria under investigation by the Gram method are stained with crystal violet but only the gram-positive bacteria, after treatment with an iodine mordant, retain that color after they are washed with alcohol, while the gram-negative bacteria, after such treatment, are decolorized after washing with alcohol. Conventionally, gram-negative bacteria are stained with a counter-stain of contrasting color.

For some time subsequent to its development the Gram method of staining bacteriological slides was carried out by hand. This method was not entirely satisfactory since the time factors for the different baths and washes are quite critical and in some instances are in the order of but a few seconds. Reproducibility of results could not therefore be assured to any great degree of accuracy. Further, the technician's hands frequently became contaminated as did his clothes. The manual method of slide staining also required the undivided attention of the technician throughout the entire procedure.

No machine has been developed for gram staining, others that have been developed for other stain tests have been tried, but results have been unsatisfactory. One form or prior art apparatus provides a single tank with a removable rack in it. Microscope slides are placed in the rack while the latter is outside of the tank. The rack then is inserted in the tank. Various reagents or water are successively fed into and withdrawn from the tank according to a predetermined time schedule. The drawbacks of this apparatus are that there is too much cross-contamination between the reagents and there is insufficient movement of the reagents and water with respect to the slides.

Another type of prior art apparatus provides a channel in which the slides with smears thereon are initially placed in a vertical position. The lower corners of each vertical slide ride between closely spaced convolutions of twin spiral helical conveyors. Subsequently the spacing between the convolutions increases, causing the slides first to tilt and then to assume a horizontal position at which time the spacing between convolutions is equal to the width of a slide so that the slides advance horizontally along the channel. The base of the channel is subdivided into various zones. These different zones are provided with grooves which are fed from reservoirs with different staining reagents or water. Two of the difficulties with the prior art apparatus just described are that the slides tend to jam on the helical conveyor and the equipment cannot handle the complex staining procedures involving a large number of steps such as Gram staining. Further, there is too much mixing of reagents and water and in many instances, such as in the Gram staining procedure, for example, it is difficult to apply to the slides the relatively large volumes of reagents and to get sufficient washing actions that are required.

SUMMARY OF THE INVENTION

1. Brief Description of the Invention

In its broadest aspect, the present invention provides an endless conveyor, e.g., a chain, one reach of which is moved along a serpentine path by a drive motor. The conveyor is provided with at least one pick-up member that couples with a hanger on which a group of slides is supported in pendent parallel transversely aligned relationship. The slide-loaded hangers are gravity fed, one at a time, to the discharge end of an inclined infeed chute at which the endmost hanger is automatically engaged by the pick-up member. Then as the endless chain follows its serpentine course, the group of slides supported by the hanger is successively dipped into a plurality of wide-mouthed tanks some of which contain reagents in a static condition and others of which contain pressurized laminar flow water and reagent circulating apparatus. The reagents and wash water are arranged in a proper sequence for bacteriological slide staining. While the lower bacteria-smeared ends of the group of slides are immersed in each tank, control means shuts off the drive motor for a predetermined length of time. A single timer is used with plural adjustable means, each associated with a different tank, to vary the shut-off times of the drive motor as the holder reaches the associated tank. In one form of the invention only a single pick-up member is used. In another form of the invention, the non-serpentine reach of the endless chain includes a second pick-up member so that when the full slide staining cycle is completed and the stained slides are automatically uncoupled from the first pick-up member and deposited on an inclined outfeed chute, the second pick-up member is ready to receive the next slide-loaded hanger. Thus, no time is lost in the return of the first pick-up member to the starting position. In another form of the invention, two or three holders are arranged in a closely spaced set on the conveyor, the spacing being such that no two holders will be in the same or adjacent tanks concurrently. The timer and adjustable means are so arranged in this form as to impart a "stutter" motion to the conveyor, i.e. a motion in which the leading group of slides is immersed in a tank for a predetermined period of time, then the conveyor is advanced enough to lift this group out of the tank and immerse the second group for the same time period. Thereafter, the same "stutter" action is repeated for each tank. Where circulation of a treating liquid or wash liquid is required novel means is included for directing the liquid against the bacteriasmeared surfaces of the slides in a laminar and, preferably, chimney, flow. Means also may be included for filtering a treating liquid if recirculation is desired.

2. Purposes of the Invention

It is an object of the present invention to provide an improved method for staining microbiological slides.

It is another object of the present invention to provide an automated apparatus for staining microbiological slides by the gram method.

A further object of the present invention is to provide improved conveyor means for moving a batch of microbiological slides into and out of successive tanks containing reagent and wash liquids.

An additional object of the present invention is to provide an apparatus, as described above, including improved control means for preselecting a plurality of different and variable lengths of time that the microbiological slides remain in each of the tanks.

A further object of the present invention is to provide a staining apparatus having improved means for impinging a laminar flow of wash water or treating liquid against the surfaces of the microbiological slides.

Still another object of the present invention is to provide a staining apparatus having new filtering means for at least one of the treating liquids used in the staining procedure.

Yet another object of the present invention is to provide a staining apparatus having improved means for automatically picking up and discharging a single hanger containing microbiological slides.

Other objects of the invention will in part be obvious and in part will be pointed out hereinafter.

The invention accordingly consists in the features of construction, combinations of elements and arrangements of parts which will be exemplified in the constructions hereinafter described, and of which the scope of application will be indicated in the appended claims.

BRIEF DESCRIPTION OF THE DRAWINGS

In the accompanying drawings, in which are shown various possible embodiments of the invention.

DESCRIPTION OF THE PREFERRED EMBODIMENTS

The present invention will first be discussed in general terms using FIGS. 1 and 2 for this purpose. There is shown in these figures a microbiological staining apparatus comprising the present invention which is designated generally by the reference character 20. The apparatus is disclosed in the form of equipment for practicing a Gram staining procedure; however, it should be understood that this particular procedure is only exemplificative and that the apparatus is designed for use in effecting any type of bacteriological staining method. If more than the seven treatment stations are needed, they are added as required.

The apparatus 20 comprises a housing 22 having an open infeed end 24 and an open discharge end 26. A control console 26 is mounted on the upper surface of the housing 22 and will be described more fully hereinafter in connection with the circuitry used with this invention.

Figures 1, 2:
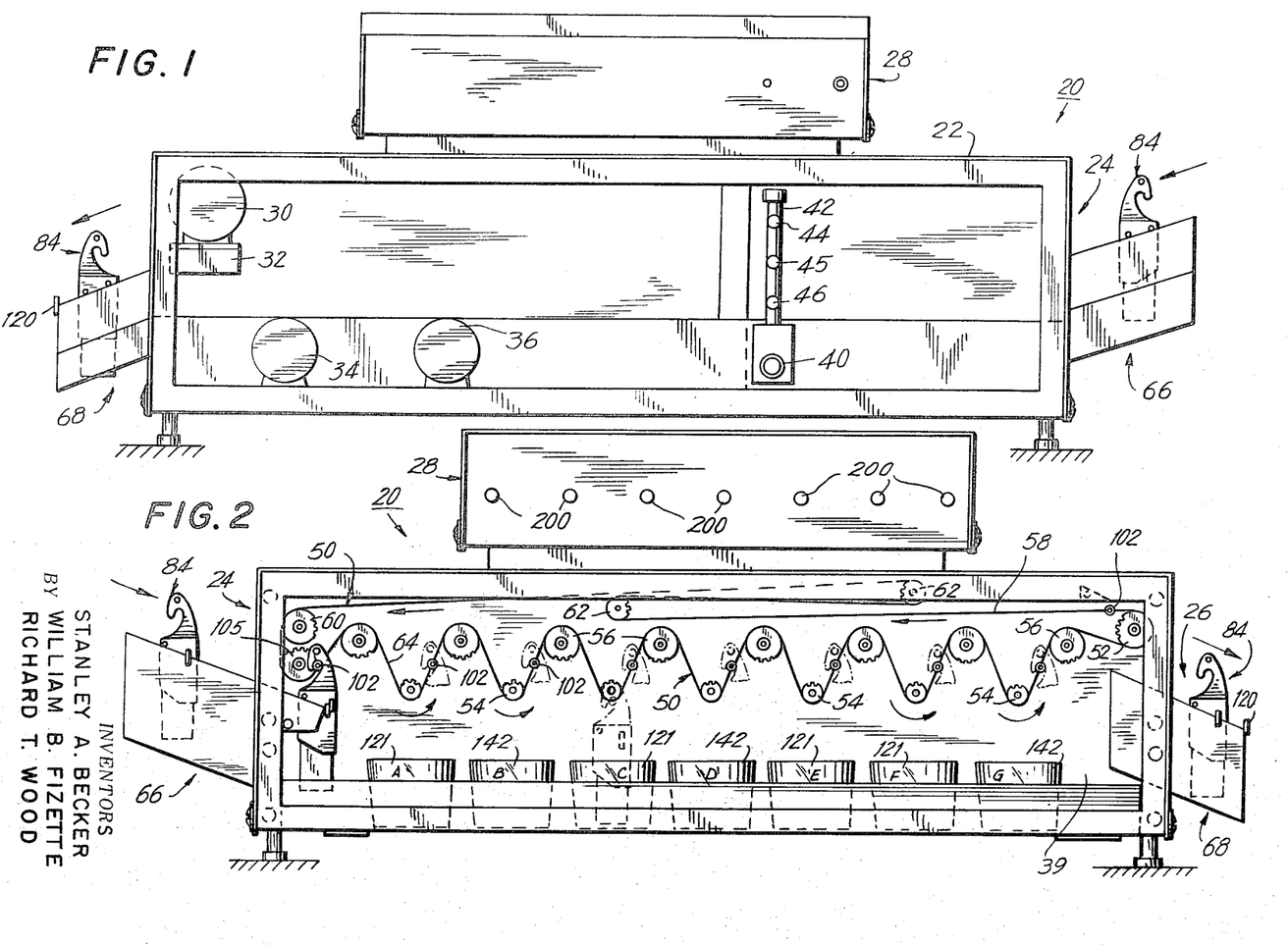
FIG. 1 is a rear elevational view of a staining apparatus embodying the present invention.
FIG. 2 is a front elevational view of said apparatus with the front cover removed.

As shown in FIG. 1, a chain drive motor 30 is mounted on a bracket 32 which is suitably secured to the housing 22. A fan 34 and a self-priming alcohol handling pump 36 are also mounted within the housing 22 in back of a vertical keel plate 39 that extends from end to end of the housing 22. A solenoid valve 40 controls connection of a water distribution conduit 42 to a pressurized water source. The water distribution conduit 42 is provided with individual regulation valves 44, 45 and 46 whose function will be described subsequently.

Referring now specifically to FIG. 2, there is shown the conveyor system of this invention which comprises an endless chain 50, a drive sprocket 52 that is affixed to and driven by the output shaft of the motor 30 and a plurality of low and high idler sprockets 54 and 56. All low idlers are at one common height. All high idlers are at a more elevated common height. The return reach 58 of the endless chain 50 extends between the drive sprocket 52 and a start sprocket 60. Two take-up sprockets 62 guide the path of the chain in the return reach and are positioned so as to define an S-path for this reach. The relative positions of the low and high idler sprockets 54 and 56 with respect to each other define a serpentine path for the operational lower reach 64 of the endless chain 50. For purposes to be described hereinafter, the length of the upper and lower reaches 58 and 64, respectively, are equal. It should also be noted that each of the idler sprockets 54 is positioned directly above a different one of the seven treatment stations A, B, C, D, E and G, inclusive, each of which represents a different step in the staining process. This aspect of the invention will also be discussed in greater detail hereinafter. All sprockets are rotatably mounted on the keel plate 39 to turn about horizontal axes.

The infeed and discharge ends 24 and 26, respectively, are comprised of infeed and outfeed chutes 66 and 68, respectively, which are secured to the housing 22 and which slope downwardly in the direction of travel of the operational reach 64 and are situated in the plane thereof.

Figures 3, 4:
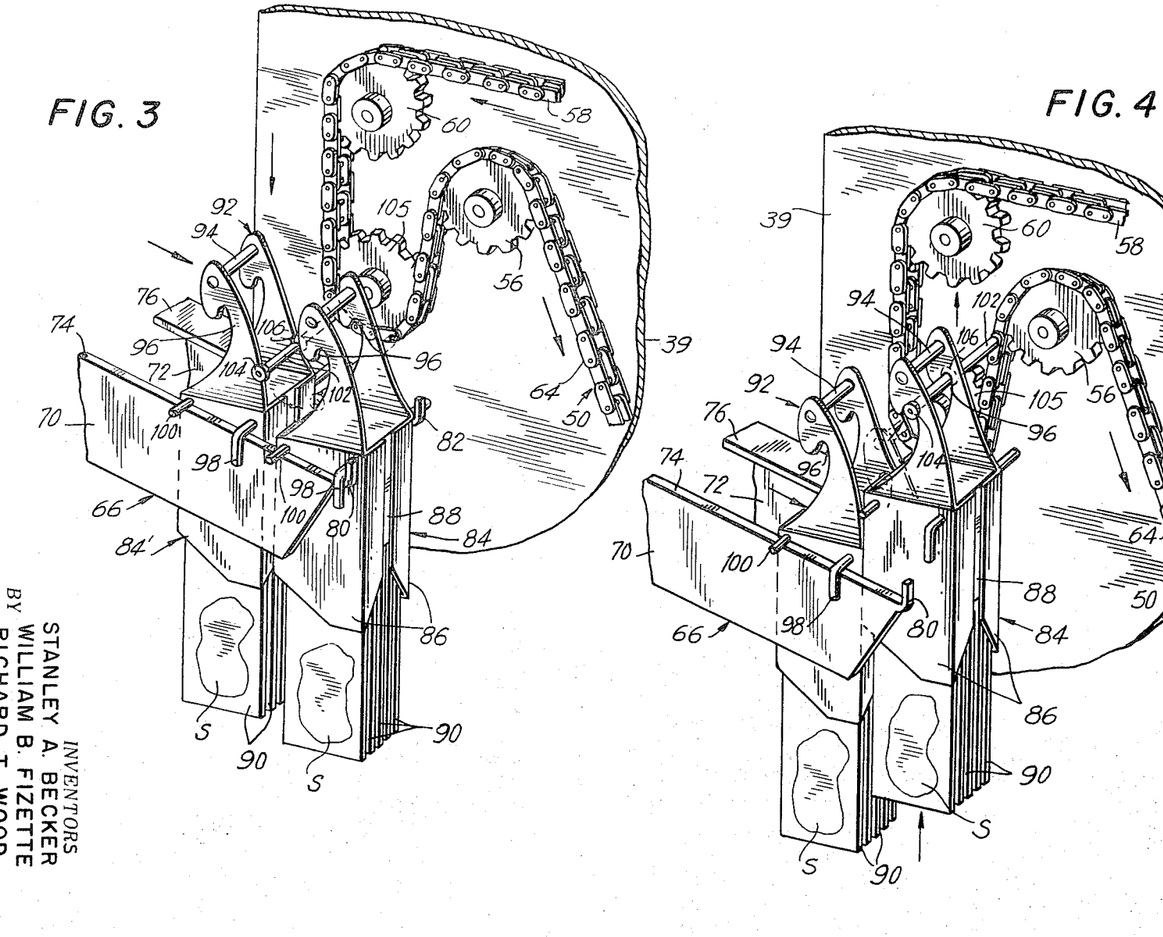
FIG. 3 is a fragmentary perspective view illustrating a portion of the infeed chute and the conveyor means of the apparatus, said view showing the pick-up as it approaches the endmost holder on the chute.
FIG. 4 is a fragmentary perspective view similar to FIG. 3 but showing the pick-up immediately after lifting off an endmost holder from the infeed chute.
Figure 5:
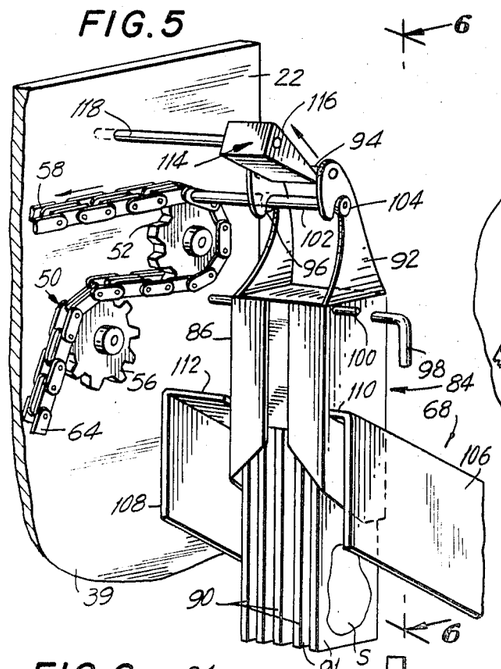
FIG. 5 is a fragmentary perspective view showing a portion of the outfeed chute and the conveyor means, said view illustrating the pick-up as the holder thereon approaches a pick-up disengaging ramp.

Considering first the infeed end 24, as shown in FIGS. 3 and 4, for example, the infeed chute 66 is comprised of a single channel, milled out to create two laterally spaced L-shaped plates 70 and 72 that have inwardly directed rails 74 and 76, respectively. It should be noted that the rail 74 is somewhat narrower than the rail 76. The lowermost ends of the rails 74 and 76 are also provided with relatively short, vertically turned stop members 80 and 82, respectively. The inner edges of the rails are parallel and define an outwardly sloping channel. Except for the last two inches of their lengths, the upper surfaces of the rails are coated, e.g. with a silicone plastic, to make the same slippery.

Figures 10, 12:
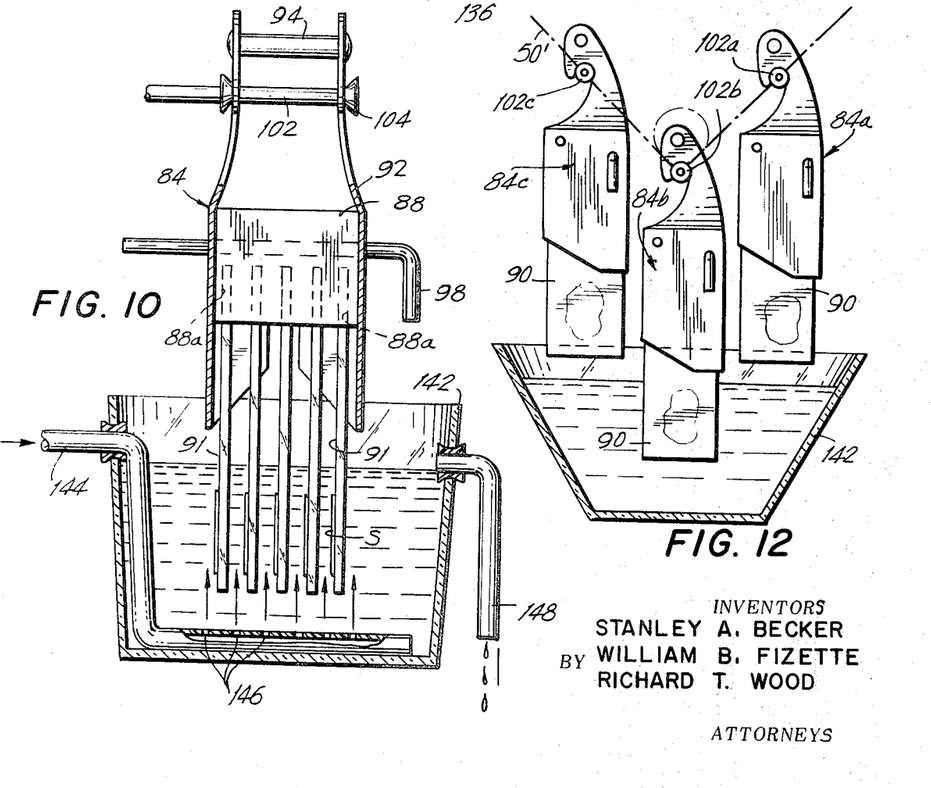
FIG. 10 is an elevational sectional view illustrating a tank with a laminar flow wash liquid circulating means.
FIG. 12 is an elevational sectional view showing a tank in association with a set of closely spaced holders embodying an alternative form of the invention.

A plurality of slide hangers, generally designated by the reference character 84, are constructed so as to slidably fit between the confronting, laterally spaced inner edges of the rails 74, 76. Each of the slide hangers 84 is comprised of a pair of parallel side walls 86 between which is secured a flexible resilient, e.g. elastomeric plastic center body 88 having a plurality of parallel vertical uniformly spaced apart downwardly open slots 88a (FIG. 10). The planes of the slots are parallel to the direction of the infeed chute. The slots are designed and dimensioned to frictionally receive the upper ends of a plurality (group) of microbiological slides 90 in parallel transversely aligned relationship. Each slide, as is conventional, has a lower side surface 91 provided with a bacterial smear S thereon containing cells that are to be microscopically examined. Preferably, the slides are so disposed that all smears face in the same direction. In the embodiment illustrated, each of the slide hangers 84 can accommodate up to five slides 90. The side walls 86 are provided with plate-like inwardly inclined (see FIG. 6) upward extensions 92 that are secured to each other near their tops by a lateral bridge pin 94. The upward extensions 92 also have aligned downwardly and rearwardly facing notches 96 formed therein. Rear and front guide rods 98 and 100, respectively, extend laterally outwardly from each of the side walls 86 of each slide hanger 84. The opposite front rods are mutually aligned as are the opposite rear rods. The guide rods 98 and 100 are arranged to slide along the top surfaces of the inwardly directed rails 74 and 76. In order to ensure that the slide hangers 84 are not inadvertently placed on the ramp 66 in a backward position the end of the forward guide rod 98 that extends over the rail 74 remote from the keel plate 39 is bent downwardly. It will be evident that because of the substantially greater width of the rail 76 the bent forward guide rod 98 will not fit thereon. Slide-carrying hangers are placed at the upper end of the infeed chute with the slides pendent. The side walls 86 fit nicely in the channel formed by the rails 74, 76. The hangers glide down the rails until the front rods come to rest against the stop members. The hangers descend with the slides vertical, the four rods riding on the sloped rails.

Figure 6:
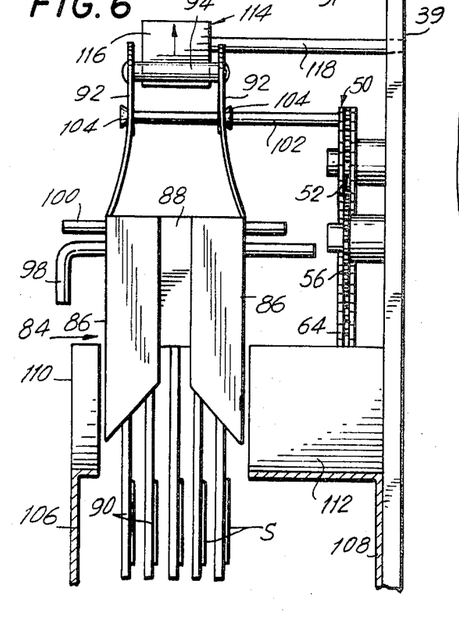
FIG. 6 is an elevational view taken substantially along the line 6—6 of FIG. 5.
Figure 7:
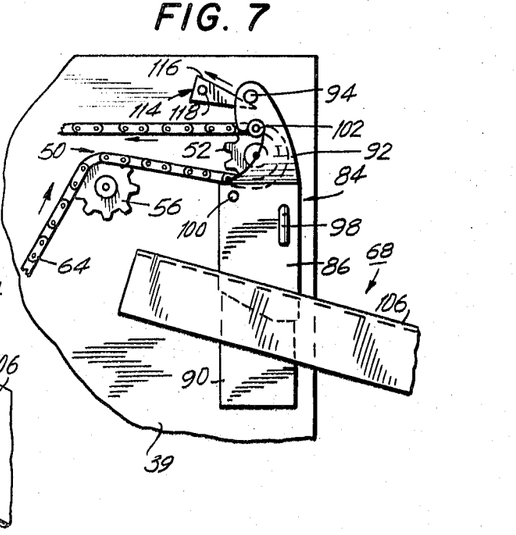
FIG. 7 is a fragmentary front view of the discharge end of the apparatus.

The endless chain 50 is provided with at least one, and preferably two, laterally extending, cantilevered horizontal pick-up pins 102, each of which has a pair of axially spaced flanges or collars 104 (see FIG. 6). The diameter of a pick-up pin 102 is so sized that it will easily fit within the aligned notches 96 formed on the extensions 92 of the slide hangers 84. The flanges 104 are axially spaced so as to be outboard of the extensions 92 when a pick-up pin 102 is in the pair of aligned notches 96 of the slide hanger 84. This relationship is shown particularly in FIG. 6. The flanges are frustoconical with the smaller ends facing one another so that, if a hanger is picked up in a slightly transversely displaced position, the extension 92 will slide along one flange until the hanger is properly positioned with each extension adjacent the small end of a nearby flange.

For purposes to be explained more fully hereinafter in connection with the "mode of operation" of the apparatus, it should be noted that the pick-up pins 102, when two of them are used, are spaced a maximum distance from each other along the endless chain 50. That is, when the endless chain 50 has a length of $x$, the two pick-up pins 102 are spaced apart by a distance of $x/2$ and both the idle reach 58 and the operational reach 64 of the endless chain 50 have a length of $x/2$. Thus, when one of the two pick-up pins 102 is discharging a slide hanger 84 at the end of a complete operational cycle of a staining process, the other pick-up pin 102 is available to engage the next slide hanger 84 in order to initiate the next staining cycle.

Adjacent the front (lower) end of the infeed chute the chain 50 engages a pick-up idler sprocket 105 so located with respect to the foremost hanger in this chute that a pick-up pin 102, as the associated link of the chain moves around said sprocket, travels through a path that first moves down in the space between the extension 92 of the foremost hanger 84 and the next following hanger 84', second, moves forwardly and raises into the notches 96 until it reaches the peaks thereof and, third, lifts the foremost hanger off the rails and clear of the stop members. As the foremost hanger is initially engaged by the pick-up pin, the top of this hanger swings slightly forwardly with the front rods 98 pivoting against the stop members 80, 82. This causes the bottom of the hanger to swing rearwardly slightly and push back against the next following hanger, forcing it (and succeeding hangers) back up the ramp, slightly, against gravity. As the pick-up pin starts to move upwardly, all hangers swing back to vertical position. This rearward kicking action helps the next hangers to move down to pickup position. When the foremost hanger has been lifted clear of the infeed chute the remaining hanger slide down until the formerly-next-following hanger becomes the new foremost hanger awaiting its turn to be started on an operational staining cycle by the same pick-up pin when it reaches the infeed chute after traversing the operational and idle reaches, or by the next succeeding pick-up pin if more than one is on the chain.

FIGS. 5, 6, 7 and 8 illustrate the structure at the discharge end 26 of the housing 22 that is used to remove the slide hangers 84 from the endless chain 50 after having completed a staining cycle. The outfeed chute 68, like the infeed chute 66, is secured to the housing 22 and is comprised of a single channel milled out to create two laterally spaced L-shaped plates 106. 108 that have inwardly directed rails 110 and 112, respectively, with the rail 110 being narrower than the rail 112 and of the same width dimension as the rail 74 of the infeed chute 66. Thus, the forward and downwardly bent guide rod 98 will positively engage the rail 110 as well as the plate 106. The inner edges of the rails 110, 112 are parallel and define a downwardly sloping channel, the front end of which is closed to detain a freshly discharged hanger awaiting removal of it and any following hangers by an operator.

Figure 8:
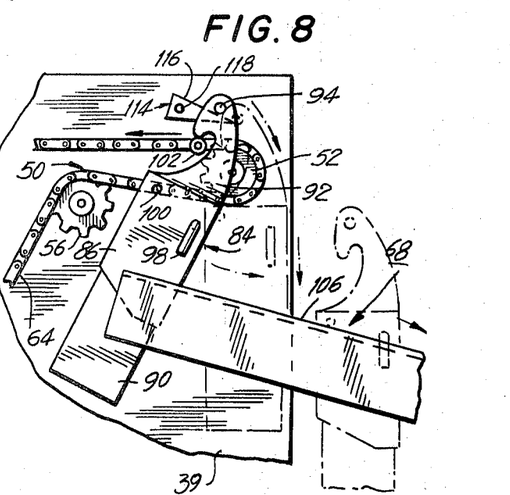
FIG. 8 is a fragmentary front view similar to FIG. 7 but showing a holder after it has been lifted off the pick-up at the completion of a staining cycle and, in phantom, after the holder has fallen into an outfeed chute.

A wedge-shaped block 114, having a forwardly and downwardly sloping ramp surface 116, is secured to a support member 118 that is rigidly mounted on the keel plate 39. The block 114 is located above the drive sprocket 42 in a position such that as the chain link carrying pick-up pin 102 travels around the drive sprocket, as shown, for example, in FIG. 5, the laterally extending pin 94 that bridges the two upwardly directed extensions 92 rides in a front-to-back direction up on the ramp surface 116 with the extensions 92 straddling the block 114. The slope of the ramp surface 116 is such that the aligned notches 96 in the extensions 92 will be lifted off the pick-up pin 102 before the slide hanger 84 reaches the position of the support member 118. Thus, as shown in FIG. 8, the slide hanger 84 will pivot back and forth about pin 94 until free of the pick-up pin 102 and then will slide down the ramp and drop under the force of gravity onto the outfeed chute so that the laterally extending guide rods 98 and 100 will engage the rails 110 and 112 and slide therealong with slide holder 84 positioned between the confronting edges of the rails 110 and 112. Stop means 120 (FIGS. 1 and 2) closes the lower end of the outfeed chute to detain the discharged slide holders 84.

As mentioned hereinabove, the present invention will be described in connection with the Gram staining process for purposes of simplicity. It should be understood, however, that the invention is not so limited. By way of example, of the seven stages A – G shown in FIG. 2, the vessel at stage A contains a Hucker's crystal violet solution bath and the vessel at stage C contains a Lugol's iodine mordant bath. The vessel at stage E contains a decolorizing agent bath, usually 95 percent ethanol, and the vessel at stage F contains a counterstain such as a safranin bath. Again, by way of example, the slides are programmed to dwell in the vessels at stages A, C, E and F for 60 seconds, 60 seconds, 45 seconds and 30 seconds, respectively, by means of a timing mechanism later described. The vessels at stages B, D, and G are used for wash water stages. The lengths of wash times in the vessels of stages B, D, and G are, by way of example, 45 seconds, 30 seconds and 30 seconds respectively. The treatments at stages A, C and F are static, i.e., slides simply are immersed in the treating liquids at these stages without any movement of the liquids except that incident to the introduction of the slides into the baths. The treatments at stages B, D, E and G are kinetic, i.e., there is movement of the liquids relative to the slides, as described hereinafter, when immersed in the treating liquids of these stages, the nature of the movement being detailed hereinafter.

The novel apparatus used at stage E (see FIG. 9) will be described first.

Figure 9:
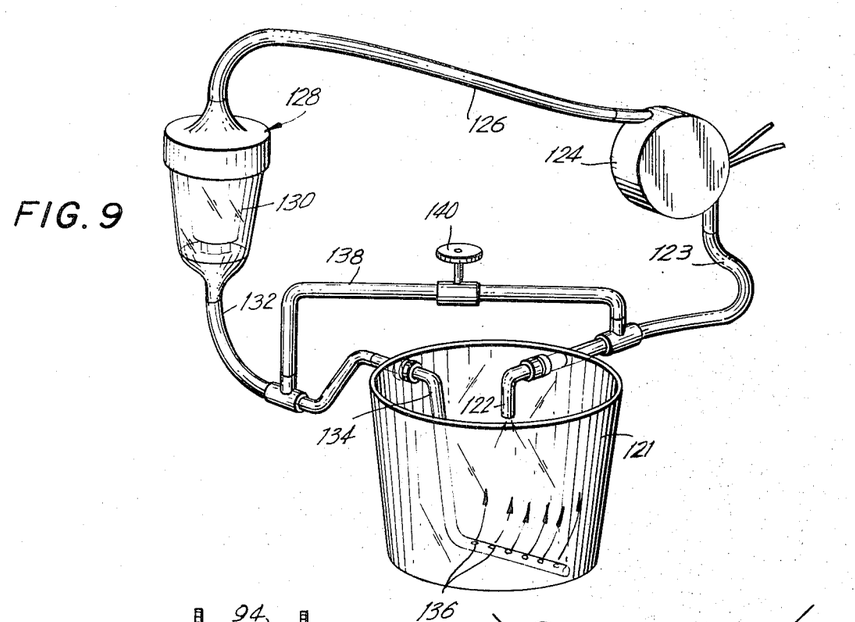
FIG. 9 is a fragmentary perspective view illustrating a filter and laminar flow system used with one of the treating liquids in the apparatus.

The decolorizing agent, e.g., a 95 percent ethanol solution, is poured into a cup-shaped vessel 121 to provide a decolorizing bath. The vessel 121 is filled with the decolorizing agent until the level thereof reaches an overflow tube 122 that is in fluid communication through a conduit 123 to the intake of a self-priming pump 124. The decolorizing agent is forced by the pump through a conduit 126 into a filter 128 having a disposable cartridge 130 containing a cation exchange resin. The contaminants in the alcohol, which primarily are crystal violet from the preceding treatment stage A, are removed by said resin. When the resin exchange capability is depleted, the cartridge 130 is removed and exhanged for a fresh unit. The purified alcohol is returned to the vessel 121 through a conduit 132 that is in fluid communication with the upper horizontal leg of a Z-shaped manifold 134 that passes through the wall of the vessel 121 proximate the open upper end thereof. The vertical leg of the manifold extends to the bottom of the vessel 121 to terminate in a horizontal lower leg that contains a plurality of upwardly facing orifices 136 located to direct jets of decolorizing agent into the spaces between the slides and across the outer faces of the outer slides in a laminar fashion to create an upwardly rising flow of liquid in a chimney effect between adjacent slides.

The pressure and, hence, rate of flow of the alcohol in the system is regulated by a bypass conduit 138 that is in fluid communication with the conduit 132 upstream of the manifold 134. A pressure regulator valve 140 is provided in the conduit 138, the other end of which is in fluid communication with the conduit 123. Thus, only filtered fluid is bypassed which allows the reagent to be reused for a considerable length of time. This is particularly important in obtaining clean, properly decolorized stains. The adjustable pressure and flow rate of the alcohol over the surface of the smears also contributes to the improved results obtained by using the present invention.

FIG. 10 particularly illustrates an important feature of the present invention. Vessel 142 which is of the type used in the water washing stages designated B, D and G in FIG. 2, is provided with a Z-shaped wash manifold 144 which is in fluid communication with a source of wash water under pressure. The lower horizontal leg of the manifold 144, contains a plurality of upwardly facing orifices 146 that are located to direct the water flow into the spaces between the slides 90 in a laminar manner to obtain a chimney effect as described with reference to stage E. The water that is directed by the orifices 146 flows over the bacterial smears so that any loose bacterial cells are picked up and carried to the top of the container 142. Excess water and the loose cells leave the container 142 through an overflow tube 148. Thus cross-contamination is minimized.

Figure 11:
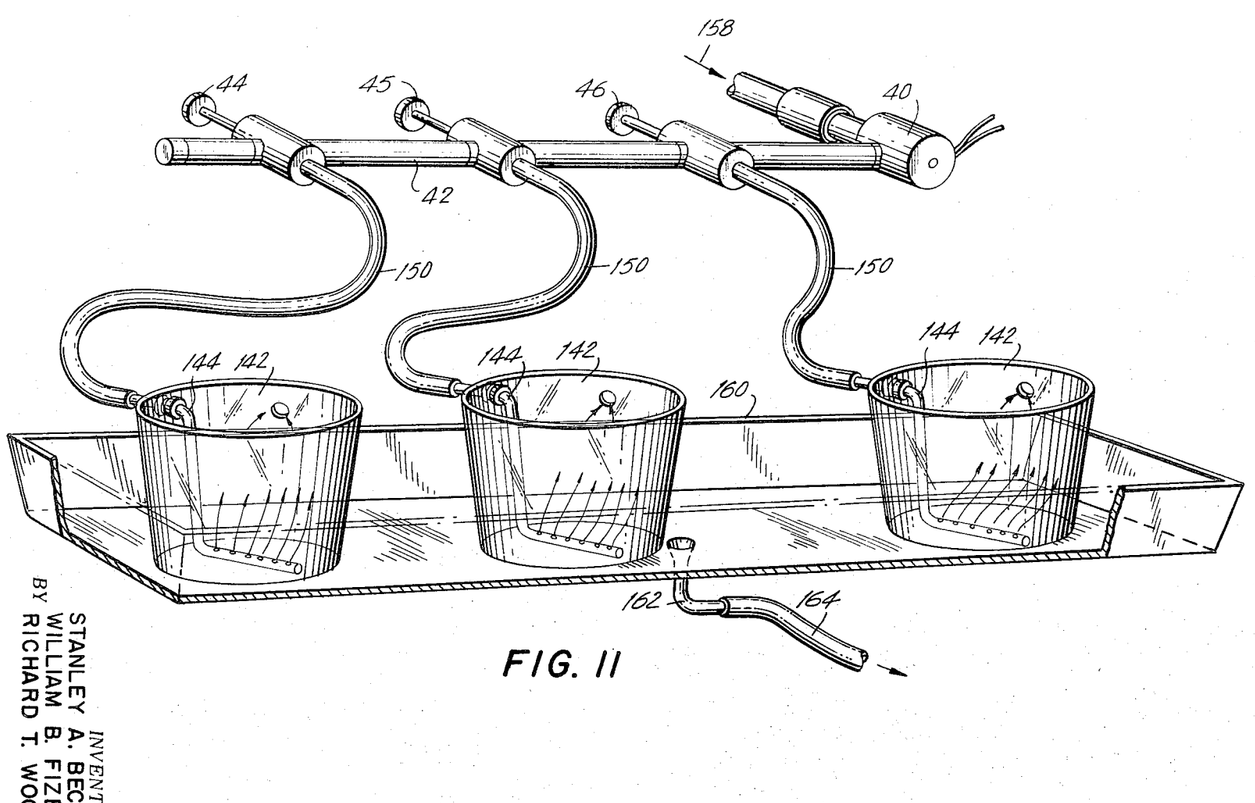
FIG. 11 is a perspective view, partially broken away, illustrating the washing system of the apparatus.

FIG. 11 illustrates the interconnection of the three wash water stages B, D and G. Each of the vessels 142 is provided with a different one of the wash manifolds 144 and an overflow tube 148 which is shown in FIG. 10. A conduit 150 connects each of the manifolds 144 to the separate, manually operated regulator valves 44, 45 and 46 that are positioned in the common conduit 42. Solenoid valve 40 is positioned at one end of the conduit 42 and is in fluid communication with the pressurized water source designated by the arrow 158. Overflow waste water drains into a common waste tray 160 and is carried away by a drain fitting 162 and a waste hose 164 to any convenient sink.

There is shown in FIG. 12 an alternative embodiment of the present invention wherein a plurality of slide hangers 84a, 84b and 84c (with constructions like that of the hanger 84), each carrying a set of parallel slides 90, are transported as a single group through a complete staining cycle. Three pick-up pins 102a, 102b and 102c are provided in closely spaced relationship on an endless conveyor chain 50'. The three slide hangers 84a, 84b and 84c are successively immersed in the container at each station by automatically stopping the motor 30 three times, one for each hanger, for the required and predetermined time period. It should be particularly noted that the spacing between hangers is such that the slides 90 on each slide hanger 84a, 84b and 84c will not be immersed in the same bath or an adjacent bath at the same time. In other words there is a "stutter" drive of the chain 50' by virtue of which the slides of the leading hanger have their lower ends immersed in the bath of a vessel 121 or 142 at a given stage before the two next sets of slides reach said vessel; the chain then stops for a set period; next the chain advances enough to lift the slides of the leading hanger out of the bath and to immerse the lower ends of the slides of the intermediate hanger in the bath; then the chain stops for the same set period, the slides of the last hanger not yet having reached the bath; thereafter the chain advances enough to lift the slides of the intermediate hanger out of the bath and to immerse the lower ends of the slides of the last hanger in the bath, the slides of the leading hanger not yet having reached the bath of the next stage; then the chain stops for the same set period; finally the chain advances enough for the slides of the leading hanger to have their lower ends immersed in the bath of the next succeeding stage and the chain stops for a new set period, etc. This arrangement of the apparatus permits larger quantities of slides 90 to be processed concurrently.

MODE OF OPERATION

Figure 13:
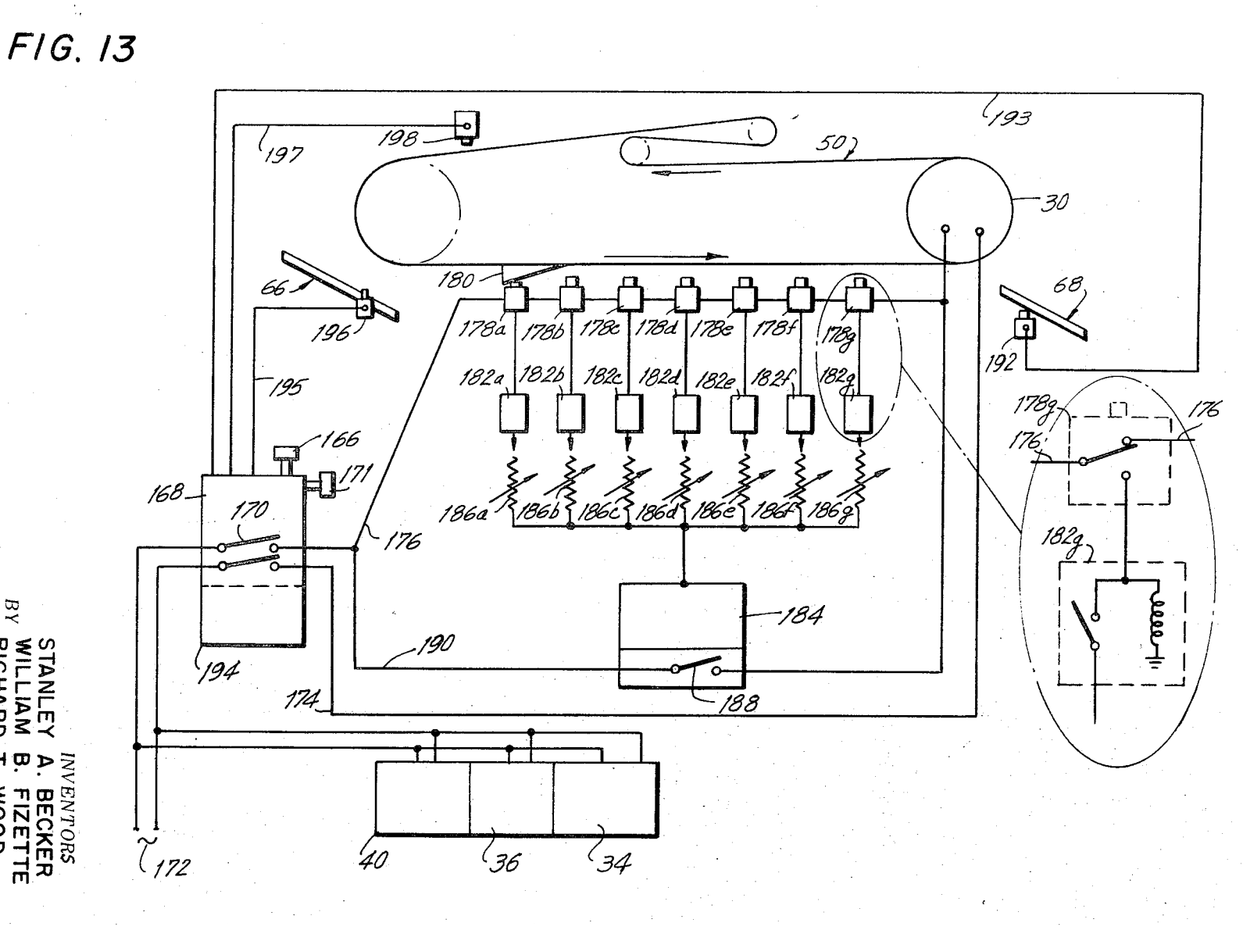
FIG. 13 is a circuit diagram illustrating the timer control system of the staining apparatus.

The mode of operation of the present invention may best be understood by reference to FIG. 13 which shows one possible embodiment of an electrical control circuit. To initiate operation, a start button 166 is depressed on the start-stop control 168 which includes a switch 170 and a timing circuit of generally known configuration. The switch 170 will remain in its last actuated position. Control 168 also includes a stop button 171 actuation of which opens switch 170. Depressing the start button 166 closes the switch 170 feeding power from a power source 172 to the motor 30 along lines 174 and 176, the latter through series connected momentary snap action switches 178a – 178g, inclusive.

The operation of the motor 30 causes the endless chain 50 to move the pick-up pin 102 into position to engage and lift the leading hanger 84 off the infeed chute 66 and move it over and toward the vessel 121 at stage A (FIG. 2) to an extent sufficient to immerse the lower ends of the slides carried thereby into the treating solution (crystal violet). This occurs as the pick-up pin 102 reaches the low point of the idler sprocket 54 over stage A.

At this point the first switch 178a is mechanically closed by a cam 180 that is secured to and travels with the endless chain 50 and engages the actuating element of the switch. The switch 178a, a typical one of which is shown in detail at 178g. is a single pole, double throw switch which, when actuated, opens the normally closed series circuit feeding the motor 30 so that the motor 30 then stops with the lower ends of slides immersed in the bath at the stage. Each switch 178a – 178g has its normally open contact respectively connected to one end of a coil in each of relays 182a – 182g, the other end of the coil being grounded. When any one of the switches 178 is depressed, its associated relay coil is energized thereby closing its normally open relay contact to activate a common timer 184 through an associated variable resistor 186a – 186g (one for each stage) which provides the desired predetermined time adjustment for the timer 184.

At the end of the preset time period for each stage, a normally open relay switch 188 inside the timer 184 closes and power is fed from the power source 172 to the motor 30 through line 190 that passes through the timer relay switch, line 190 shunting line 176. The motor 30 starts again and the endless chain 50 moves the cam 180 off of the switch 178a thereby disconnecting the timer 184 by deenergizing the coil of relay 182a and reenergizing the motor 30 through its original lines 174 and 176 that includes the series path of the switches 178a – 178g. The motor 30 continues to drive the endless chain 50 until the next position is reached wherein the operation described above is repeated, this time using the variable resistor 182b associated with the next stage which keeps the slides 90 in the second vessel at stage vessel at stage B for the required time period.

Where there are two equally spaced pins 102, two cams 180 are provided, one for each pin. Likewise where there are a group of pins, a different cam is employed for each pin.

When the staining cycle for a group of slides 90 carried by a hanger is completed, the slide hanger 84 is dropped onto the output ramp 68 to await removal by an operator.

A momentary snap-action switch 192 having its actuating element located high on the outfeed chute 68 stops the motor 30 from running when the outfeed chute 68 is full. As each slide hanger 84 drops onto the outfeed chute 68 and slides therealong, it depresses the actuating element of said switch 192. A timer 194 located within the start-stop control panel 168 and connected to switch 192 by a line 193 is set, for example at 5 seconds, and said timer is actuated by the switch 192 such when a slide hanger 84 depresses the actuating element of the switch 192 for longer than 5 seconds, the start-stop control 168 is turned off. Only the last slide hanger 84 in the outfeed chute will do this.

A momentary snap-action switch 196 having its actuating element located low on the infeed chute 66 is connected through a line 195 to the control 168. The actuating element of a momentary snap-action switch 198 (connected to the control 168 through a line 197) is depressed by the cam 180 after the last slide hanger 84 has completed its staining cycle. Switches 196, 198 are connected in series in the control 168. When both switches are actuated (infeed chute empty and staining cycle of the last slide hanger leaving the infeed chute completed), the control 168 turns off the motor 30 and the machine is in a "wait" condition ready to restart when a fresh slide hanger is placed on the infeed chute.

The switches 196 and 198 permit the apparatus to continue running only as long as the infeed chute 66 contains at least one slide hanger 84 carrying slides 90 to be stained and the output ramp 68 is not full.

When the stop button 171 is actuated the apparatus will not stop until the cam 180 actuates the switch 198 so that the apparatus stops only at the end of a staining cycle whereby no slides will be spoiled by too long an immersion in a liquid at any stage.

Ancillary devices, including the alcohol pump 36, the wash water solenoid valve 40 and the fan that dries stained slides positioned on the outfeed chute 34 are operated from the source of power 172. Indicator lights may be provided to show the operation status and can be activated by either the switches 178a – 178g or the contacts in the relays 182a –0 182g. Although particular switches and circuit arrangements are shown, it is well within the scope of the invention and the state of the art to provide other similarly functioning structure.

From the foregoing it will be evident that an improved method and apparatus have been provided. The present invention provides means for the separate and variable timing of each step in the process of microbiological staining by means of an intermittently moving conveyor that carries only a single slide hanger or a closely spaced group of slide hangers through each complete staining cycle. High quality stains are thus achieved with consistently reproducible results. The apparatus is fully automatic and economical to use. The use of a common timer reduces cost and simplifies maintenance. The individual timing adjustments for each stage enables different stages to have their dwell times predetermined. The apparatus shuts off automatically after the slides have been processed. Safety means prevent operation of the apparatus when unloading is required.

As applied to the microbiological slide staining process for both thick and thin smears, the broadest aspect of the method of this invention includes the steps of loading a plurality of prepared slides into conveyor means for movement together therewith, causing relative movement between the conveyor means and the baths required for the slides, and then removing and drying the slides. Specifically, the one embodiment of the present invention that has been illustrated provides that the slides are carried and guided by a novel conveyor that follows a serpentine path whereby the slides are immersed and dwell in and are removed from successive baths. Individual and variable timer means associated with each bath controls the length of immersion-dwell time of the slides in the various liquids as well as liquid flow rates where desired. Since the timer controls 200 are situated on the control console 28 above, near and in the same order as their respective baths, it is a simple matter for the laboratory technician to make whatever critical adjustments are required to achieve optimum results.

The novel conveyor of this invention includes means for picking up only a single slide hanger at a time and then discharging it after its staining cycle is completed. By making the return upper reach of the conveyor S-shaped and equal in length to the serpentine lower operational reach, another feature of this invention is evidenced. That is, two equally spaced pick-up means may be employed to thereby avoid the need for waiting until a single pick-up means returns from the discharge end of the apparatus to the starting point after the completion of a staining cycle.

A novel filtering system including a bypass and a disposable filter element provides for economical use of the decolorizing alcohol. In the decolorizing step as well as in the wash steps a unique manifold arrangement directs a laminar flow of fluid over the surfaces of the slides. The chimney effect thus created displaces loose contaminants for subsequent removal and, together with a close control of fluid pressures, results in an improved end product with minimal cross-contamination.

It thus will be seen that there are provided methods and apparatuses which achieve the several objects of the invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described the invention there is claimed as new and desired to be secured by Letters Patent:

1. A method for staining of biological material on flat faced slides in accordance with a predetermined procedure, said method comprising the steps of:
   a. applying biological material to the slides;
   b. introducing different liquids with which the material is to be treated in a predetermined order into a plurality of vessels;
   c. subdividing the slides into groups;
   d. maintaining any given group with its flat faces mutually parallel and vertical;
   e. imparting intermittent relative movement between any given group and the vessels in a manner such as to successively dip ends of the slides in the given group in the liquids in successive ones of the vessels in said predetermined order while the same are vertical and then temporarily dwell therein in the same vertical condition and then remove the slides therefrom while still vertical, each of the dips defining a step in the staining procedure; and
   f. selectively controlling in a regulatable predetermined manner the length of time that the ends of the slides of the given group of slides are dipped in each vessel in said vertical condition,
   g. only a single group of slides being dipped in all the vessels before another group is so treated.

2. The method in accordance with claim 1 wherein said step of imparting relative movement comprises moving the slides along a serpentine path that includes successive high and low points in a manner such that the slides are dipped in the different liquids at successive low points of the serpentine path.

3. The method in accordance with claim 1 wherein one of the liquids is a decolorizing agent and further including the steps of filtering the decolorizing agent and recirculating said agent through the associated vessel at a controllable flow rate.

4. The method in accordance with claim 3 wherein said filtering step comprises the step of passing the decolorizing agent through an ion exchange resin.

5. The method in accordance with claim 1 further including the step in at least one of the vessels of directing a laminar upward flow of liquid between the flat surfaces of the slides in a group containing the material to create a chimney effect whereby contaminants are removed therefrom with minimal cross-contamination.

6. A method in accordance with claim 5 including the step of controlling the flow rate of said liquid.

7. A method for staining biological materials on a group of flat faced slides which method includes dipping the slides in at least one liquid contained in a vessel and leaving the group of slides therein temporarily with their flat faces mutually parallel and vertical, including the improvement of directing a laminar upward flow of said liquid between the flat surfaces of the slides containing the materials to create a chimney effect whereby contaminants are removed therefrom with minimal cross-contamination.

8. A method as set forth in claim 7 including the step of controlling the flow rate of said liquid.

* * * * *